United States Patent [19]
de Queiroz et al.

[11] Patent Number: 6,058,210
[45] Date of Patent: May 2, 2000

[54] USING ENCODING COST DATA FOR SEGMENTATION OF COMPRESSED IMAGE SEQUENCES

[75] Inventors: Ricardo L. de Queiroz, Fairport; Gozde Bozdagi, Rochester, both of N.Y.

[73] Assignee: Xerox Corporation, Stamford, Conn.

[21] Appl. No.: 08/931,098

[22] Filed: Sep. 15, 1997

[51] Int. Cl.[7] .................................................. G06K 9/36
[52] U.S. Cl. ......................... 382/232; 382/173; 382/235; 382/236
[58] Field of Search .................................. 382/232, 233, 382/235, 236, 238, 244, 245, 246, 248, 250, 251, 253, 173, 166, 171; 348/231; 345/501

[56] References Cited

U.S. PATENT DOCUMENTS

| | | | |
|---|---|---|---|
| 5,335,016 | 8/1994 | Nakagawa | 348/405 |
| 5,367,629 | 11/1994 | Chu et al. | 395/162 |
| 5,535,288 | 7/1996 | Chen et al. | 382/236 |
| 5,576,767 | 11/1996 | Lee et al. | 348/413 |
| 5,592,226 | 1/1997 | Lee et al. | 348/413 |
| 5,635,982 | 6/1997 | Zhang et al. | 348/231 |
| 5,719,643 | 2/1998 | Nakajima | 348/700 |
| 5,778,192 | 7/1998 | Schuster et al. | 395/200.77 |
| 5,835,163 | 11/1998 | Liou et al. | 348/700 |
| 5,838,831 | 11/1998 | De Queiroz | 382/248 |
| 5,854,857 | 12/1998 | De Queiroz et al. | 382/232 |
| 5,878,166 | 3/1999 | Legall | 382/232 |
| 5,909,572 | 6/1999 | Thayer et al. | 395/567 |
| 5,911,008 | 6/1999 | Nikura et al. | 382/236 |

OTHER PUBLICATIONS

Digital Video Processing, Prentice–Hall, 1995, by A. Murat Tekalp, Chapter 23, pp. 432–456.

Committee Draft of the Standard: ISO/IEC CD 11172, "Coding of Moving Pictures and Associated Audio for Digital Storage Media at up to about 1.5Mbit/s," Dec. 1991.

Committee Draft of the Standard: ISO/IEC CD 13818–2, "Generic Coding of Moving Pictures and Associated Audio Information: Video", Nov. 1993.

"Scene Change Detection in a MPEG Compressed Video Sequence," by J. Meng, Y. Juan and S.–Fu Chang in SPIE Symposium on Electric Imaging, Science and Technology—Digital Video Compression: Algorithms and Technologies, 1995.

"Video and Image Processing in Multimedia Systems", Kluwer Academic Publishers, 1996, by Furht, Simoliar and Zhang.

"Indexing of Compressed Video Sequences," by F. Idris and S. Panchanathan in SPIE vol. 2670, 1996.

"Rapid Scene Analysis on Compressed Video," by B.–L. Yeo and B. Liu in IEEE Trans. Circuits and Systems for Video Tech., 1995.

JPEG: Still Image Compression Standard, New York, NY, Van Nostrand Reinhold, 1993 by W. B. Pennebaker and J. L. Mitchell.

*Primary Examiner*—Matthew C. Bella
*Assistant Examiner*—Kanji Patel
*Attorney, Agent, or Firm*—Mark Costello

[57] ABSTRACT

A method for processing compressed digital data derived from an original image sequence, the data being organized as a set of image frames, each image frame comprising a set of blocks, each block including a string of bits corresponding to an area of the original image frame in the original image sequence. A cost function is derived as a number related to the amount of bits spent to encode a block, sets of blocks, an image frame, or sets of image frames. A segmentation technique is applied to the map with cost functions. Temporal segmentation is performed by analyzing cost functions associated with each image frame. In both cases auxiliary functions can be used to improve the segmentation quality. The segmented regions of a image frame or sets of image frames can be identified, replaced, printed, or processed in special manners.

20 Claims, 11 Drawing Sheets

Si

USING ENCODING COST DATA FOR SEGMENTATION OF COMPRESSED IMAGE SEQUENCES

CROSS-REFERENCE TO RELATED APPLICATION

Reference is made to the following co-pending patent applications: Ser. No. 08/721,074, entitled "Using Encoding Cost Data for Segmentation and Background Suppression in JPEG-Compressed Images" by Eschbach and de Queiroz, and Ser. No. 08/721,519, entitled "Compression of Image Data with Retaining Cost Data for Each Compressed Image Block", by R. de Queiroz, both assigned to the same assignee as the present invention.

INCORPORATION BY REFERENCE

The following U.S. patent is hereby incorporated by reference: U.S. Pat. No. 5,635,982, entitled "System for Automatic Video Segmentation and Key Frame Extraction for Video Sequences Having Both Sharp and Gradual Transitions." to Zhang et al. Also included by reference is the following material providing background information: Digital Video Processing, Prentice-Hall, 1995, by A. Murat Tekalp, Chapter 23, pp. 432–456; Committee Draft of the Standard: ISO/IEC CD 11172, "Coding of Moving Pictures and Associated Audio for Digital Storage Media at up to about 1.5 Mbit/s," December, 1991; Committee Draft of the Standard: ISO/IEC CD 13818-2, "Generic Coding of Moving Pictures and Associated Audio Information: Video", November 1993; "Scene Change Detection in a MPEG Compressed Video Sequence," by J. Meng, Y. Juan and S.-Fu Chang in SPIE Symposium on Electronic Imaging, Science and Technology—Digital Video Compression: Algorithms and Technologies, 1995; "Video and Image Processing in Multimedia Systems", Kluwer Academic Publishers, 1996, by Furht, Simoliar and Zhang; "Indexing of Compressed Video Sequences," by F. Idris and S. Panchanathan in SPIE Vol. 2670, 1996; "Rapid Scene Analysis on Compressed Video," by B.-L. Yeo and B. Liu in IEEE Trans. Circuits and Systems for Video Tech., 1995; JPEG: Still Image Compression Standard, New York, N.Y., Van Nostrand Reinhold, 1993 by W. B. Pennebaker and J. L. Mitchell.

FIELD OF THE INVENTION

The present invention relates to a method for processing compressed image sequences, where an image sequence is a temporal sequence of digitized image frames, with the intention to identify time instants in the image sequence, or regions within an image plane frame, that have particular characteristics, without the requirement to decompress the image sequence.

BACKGROUND OF THE INVENTION

The book Digital Video Processing, Prentice-Hall, 1995, by A. Murat Tekalp, along with the committee drafts ISO/IEC CD 11172 and ISO/IEC CD 13818-2, incorporated by reference above, provides a general overview of data-compression techniques which are consistent with MPEG device-independent compression standards. The book JPEG: Still Image Compression Standard, New York, N.Y.: Van Nostrand Reinhold, 1993 by W. B. Pennebaker and J. L. Mitchell, incorporated by reference above, gives a general overview of data-compression techniques which are consistent with JPEG device-independent compression standards.

While JPEG is applicable to still images, MPEG is applicable to audio and video image sequence data.

MJPEG is a less formal standard used by several manufacturers of digital video equipment. In MJPEG, the moving picture is digitized into a sequence of still image frames, such as in most representations of moving pictures, and each image frame in an image sequence is compressed using the JPEG standard. Therefore, a description of JPEG suffices to describe the operation of MJPEG. The details of the operation of the MJPEG and MPEG standards are included in the above referenced books and the committee drafts, but for present purposes, the essential properties of MJPEG and MPEG compressions are as follows: Each image frame of an original image sequence which is desired to be transmitted from one hardware device to another, or which is to be retained in an electronic memory, is divided into a two-dimensional array of typically square blocks of pixels. The "transmitter" is understood to be apparatus or a computer program which reads the original image sequence and generates compressed data. The "receiver" is apparatus or a computer program which receives and decompresses the compressed data, reconstructing an approximation of the original image sequence therefrom. In one typical embodiment, the original image frame is divided into blocks, each block comprising 8×8=64 pixels from the original image frame. Each individual pixel in the original image frame, in turn, may express a gray scale value, which may be on a scale from, for example, 0 to 255 or 0 to 4095. There is thus derived from each block in an original image frame to be compressed and transmitted a matrix of 64 gray level values, each value relating to one pixel in an 8×8 matrix.

Each matrix is then subjected to certain operations for compression. In MJPEG, each image frame is compressed using the standard JPEG compression technique. In JPEG, the first step is to perform a "discrete cosine transform," or DCT. In effect, the DCT changes the image space for the matrix, so that a vector related to the average luminance of all of the pixels in the block is made into an axis of the space. Following the DCT, the coefficients in the original matrix still completely describe the original image data, but larger value coefficients tend to cluster at the top left corner of the matrix, in a low spatial frequency region. Simultaneously, the coefficient values toward the lower right hand portion of the matrix will tend toward zero for most blocks in an image frame in an image sequence.

The top-left entry in each matrix, which represents the average luminance of all pixels in the matrix, is known in JPEG (and therefore in MJPEG) as the "DC coefficient" of the block, with all the other entries in the matrix being known in MJPEG as the "AC coefficients" of the block. In a preferred embodiment of MJPEG, the transmitted DC coefficient of each block is converted to a difference relative to the DC coefficient of the block to the left of the block in the original image frame; this makes the magnitude of each DC coefficient smaller in absolute terms.

Following the DCT step, individual coefficients in the matrix are quantized, or in effect made into smaller numbers, and rounded. Then, the quantized coefficients are Huffman-encoded to yield a string of binary digits, or bits. There may be other lossless compression steps to encode the quantized DCT coefficients, but the final product is a string of bits for each block, each block resulting in a string of bits of a different length.

Under MJPEG compression, each block of each image frame of the original image sequence will result in a string of bits of unpredictable length. A block including more detail is generally more difficult to compress than a block which is relatively smooth. In this sense, active blocks, with more details or sharp edges, are generally encoded using a larger amount of bits. On the other hand, smooth blocks generally demand few bits for its encoding. There is a non-trivial relation between the activity of a block and the number of bits used in the encoding, i.e. the compression achieved.

In MPEG compression, motion information obtained from nearby frames is used as a prediction tool to increase compression of the image frame data. The first step is to choose which "frame type" to use for each image frame. In order to increase compression and quality, three main frame types are defined. One frame type does not use any motion information, while the other two utilize motion compensation derived from neighbor frames to predict the image data blocks pertaining to an image frame. Intra-coded frames (I-frames) are encoded without reference to other frames. Predicted frames (P-frames) are encoded using motion compensated prediction from a past frame. Bi-directionally-predicted frames (B-frames) are encoded using motion compensated prediction from a past and/or a future frame. Having defined the frame types, each image frame is divided into a two-dimensional array, typically square blocks of pixels. In one typical embodiment, the frame is divided into blocks, each block comprising 8×8=64 pixels from the original frame. Each individual pixel in the frame, in turn, may express a gray scale value, which may be on a scale from, for example, 0 to 255 or 0 to 4095. Therefore, each block in an image frame to be transmitted, a matrix of 64 gray level values is generated, each gray level pixel value relating to one pixel in an 8×8 matrix. This matrix is then subjected to certain operations described next.

It is illustrative to separate the case where frames only contain intraframe encoded blocks from the case of frames which contain interframe encoded blocks. A block is referred to as being intraframe encoded if it is encoded by itself without being predicted by blocks pertaining to preceding or subsequent frames. A block is referred to as being interframe encoded when it does use motion information collected from blocks pertaining to any preceding or subsequent frames. Frames that only contain intraframe encoded blocks are the frames in MJPEG, the I-frames in MPEG and occasionally B- or P-frames that do not contain motion compensation predicted blocks. Frequently, B- and P-frames contain interframe encoded blocks.

If the frame is an I-frame, each original block in the frame is transformed using the DCT without any motion compensation, in a method similar to the method used in MJPEG. Following the DCT, the coefficients in the original matrix still completely describe the original block data, but larger value coefficients tend to cluster at the top left corner of the matrix, in a low spatial frequency region. Simultaneously, the coefficient values toward the lower right hand portion of the matrix will tend toward zero for most original and residual blocks in a frame in an image sequence. Following the DCT step, individual coefficients in the matrix and motion vector are quantized, or in effect made into smaller numbers, and rounded. Then, the quantized coefficients are encoded to yield a string of binary digits, or bits. The encoding method typically comprises a combination of run-length counting and Huffman codes. There may be other compression steps to encode the quantized DCT coefficients, but the final product is a string of bits for each block, each block resulting in a string of bits of a different length.

If the frame is either a P- or a B-frame, for each block in the present original frame, a search for a matching block in a frame in the past (forward motion prediction in a P-frame) or a frame in the past or future (bi-directional motion prediction in a B-frame) is performed. Once a matching block is found, a vector indicating the magnitude and direction of the motion is formed as a string of bits. The motion vector indicates how to find the matching block within the neighbor frame. This method of processing is called motion compensation. The matching block is used as a predictor for the actual block. The difference between original and matching blocks is called a residual. The residual error is encoded using specific coding techniques resulting in a string of bits. If a good match is found, the strings of bits corresponding to the motion vector and residual error are transmitted to the receiver. The residual block is transformed, quantized and encoded into a string of bits using the same method used for blocks in an I-frame. There may be other compression steps to encode the residual quantized DCT coefficients and motion vectors, but the final product is a string of bits for each block, each block resulting in a string of bits of a different length. If no good match is found for the present block among blocks in past and/or future frames, the block is encoded in the same way as blocks in I-frames. In effect, this is equivalent to predict the block as being a block with all zero pixels. Thus, the residual is the original block itself.

In MPEG, blocks in P- and B-frames are classified individually. Classifications are encoded into a string of bits and transmitted to the receiver. The block classifications convey information (to the receiver) about the matching block procedure. Details can be found in the drafts ISO/IEC CD 11172 and ISO/IEC CD 13818-2, incorporated by references above. For the present, it is important to emphasize that three types of information are sent to the receiver encoded as strings of binary digits or bits: motion vectors, residual blocks and classification.

Under MPEG compression, each block of each frame of the original image sequence will result in a string of bits of unpredictable length. A block with more details and with no match in the past or future frames is generally more difficult to compress than a smooth block or a block which has a match in the past or future frames. In this sense, active blocks, are generally encoded using a larger amount of bits. On the other hand, non-active blocks generally demand few bits for its encoding. There is a non-trivial relation between the activity of a block and the number of bits used in the encoding, i.e. the compression achieved.

It is understood that a "block" may correspond to a single tile of an image frame in an image sequence or to any predefined region of an image frame in an image sequence, encompassing multiple colors, or any predefined regions of multiple frames in an image sequence. In the preferred embodiment of the compression application (MJPEG/MPEG), one or a plurality of blocks of each color separation can be grouped to form larger structures known for those skilled in the art of MJPEG as MCU (minimum coded unit) or, for those skilled in the art of MPEG, as macroblocks. According to the present invention, it is understood that a block may represent one or multiple blocks, or one or multiple MCUs or macroblocks.

As is well known, in a digital printing apparatus, the data associated with black text in an original image will typically require a high contrast printing technique when the image is printed. For example, a halftone or contone image will be optimally printed with slightly different printing techniques, irrespective of the general printing technology (for example, xerographic or ink-jet). It is therefore desirable, when an image is received, to be able to identify specific portions of the image as text, graphics, or pictures. In most cases, the image is available in compressed format. The identification of the said regions may involve decompressing the image and applying a segmentation algorithm. It is desirable to utilize the compressed data directly to ascertain which printing techniques will be applied to each image region.

Similarly, in a digital video processing apparatus, the data associated with smooth motion in an original image sequence will typically require a different processing technique than the data associated with sudden motion. It is therefore desirable, when an image sequence is received, to be able to identify specific portions of the image sequence with particular characteristics. In most cases, the image sequence is available in compressed format. The identifications of the said portions may involve decompressing the image sequence and applying a segmentation algorithm. It is desirable to utilize the compressed data directly to ascertain which processing techniques will be applied to each image sequence portion.

The above-referenced co-pending applications disclose the creation of an "encoding cost map" derived from compressing, and using the encoding cost map for segmenting the original image. The encoding cost map is assembled from data derived from compression of an original image data, where the image data is composed of either a single image or a sequence of images. The encoding cost map can be derived from the compressed data directly, or it can be stored along with the compressed data as shown in the co-pending application. In the encoding cost map, the longer the resulting string of bits from compression of a particular block, the higher the cost function for that block. When assembled in a two-dimensional map, these cost functions form the encoding cost map. Similarly, encoding cost maps can be formed in one-dimensional vectors where cost functions are associated with data temporal instances derived from compression of an original image sequence data. It is an object of the present invention to use the encoding cost map for segmenting the original image sequence into groups of frames with particular characteristics or to segment individual frames into regions with particular characteristics.

U.S. Pat. No. 5,635,982 discloses a system for temporal segmentation of image sequences into individual camera shots in the uncompressed domain. The system detects the individual shots by analyzing the temporal variation of video content.

"Digital Video Processing", by Tekalp, describes common techniques for compression of digital image sequences at pages 419 through 499.

ISO/IEC CD 11172 and ISO/IEC CD 13818-2 describe in detail the functionality and normalize the operations of an MPEG encoding apparatus.

"Scene Change Detection in a MPEG Compressed Video Sequence," by J. Meng, Y. Juan and S.-Fu discloses a scene change detection technique for compressed MPEG bitstream with minimal decoding of the bitstream. Minimal decoding refers to decoding of the bit stream just enough to obtain motion vectors and the DCT DCs.

"Video and Image Processing Systems", by Furht, Simoliar and Zhang gives an overview of the techniques used in both compressed and uncompressed domain scene cut detection.

"Rapid Scene Analysis on Compressed Video," by B.-L. Yeo and B. Liu discloses a scene change detection technique that operates on the DC sequence which can be extracted from MJPEG or MPEG compressed video.

A basic text which describes JPEG (from which MJPEG is derived) and associated techniques is W. B. Pennebaker and J. L. Mitchell, JPEG: Still Image Compression Standard, New York, N.Y.: Van Nostrand Reinhold, 1993.

SUMMARY OF THE INVENTION

According to the present invention, there is provided a method of processing compressed digital data derived from an original image sequence, the data being organized as a set of frames, each frame comprising a set of blocks, each block comprising a string of bits corresponding to an area of the original frame in the original image sequence. A cost function is derived as a value related to the amount of bits spent to encode a block, sets of blocks, a frame, or sets of frames, depending on whether temporal or spatial segmentation is required. A segmentation technique is applied in accordance with derived cost functions.

In accordance with another aspect of the present invention, there is provided a method of processing compressed digital data derived from an original image sequence, the data being organized as a set of frames, each frame comprising a set of blocks, each block comprising a string of bits corresponding to an area of the original frame in the original image sequence. A cost function is derived as a value related to the amount of bits spent to encode a block, sets of blocks, a frame, or sets of frames, depending on whether temporal or spatial segmentation is required. Additionally an auxiliary function is derived from the compressed data, such an auxiliary function being related to the motion vectors, block classification, DC coefficients, or their statistics. A segmentation technique is applied to the map with cost functions in combination with the auxiliary function.

DETAILED DESCRIPTION OF THE INVENTION

Figure 1:
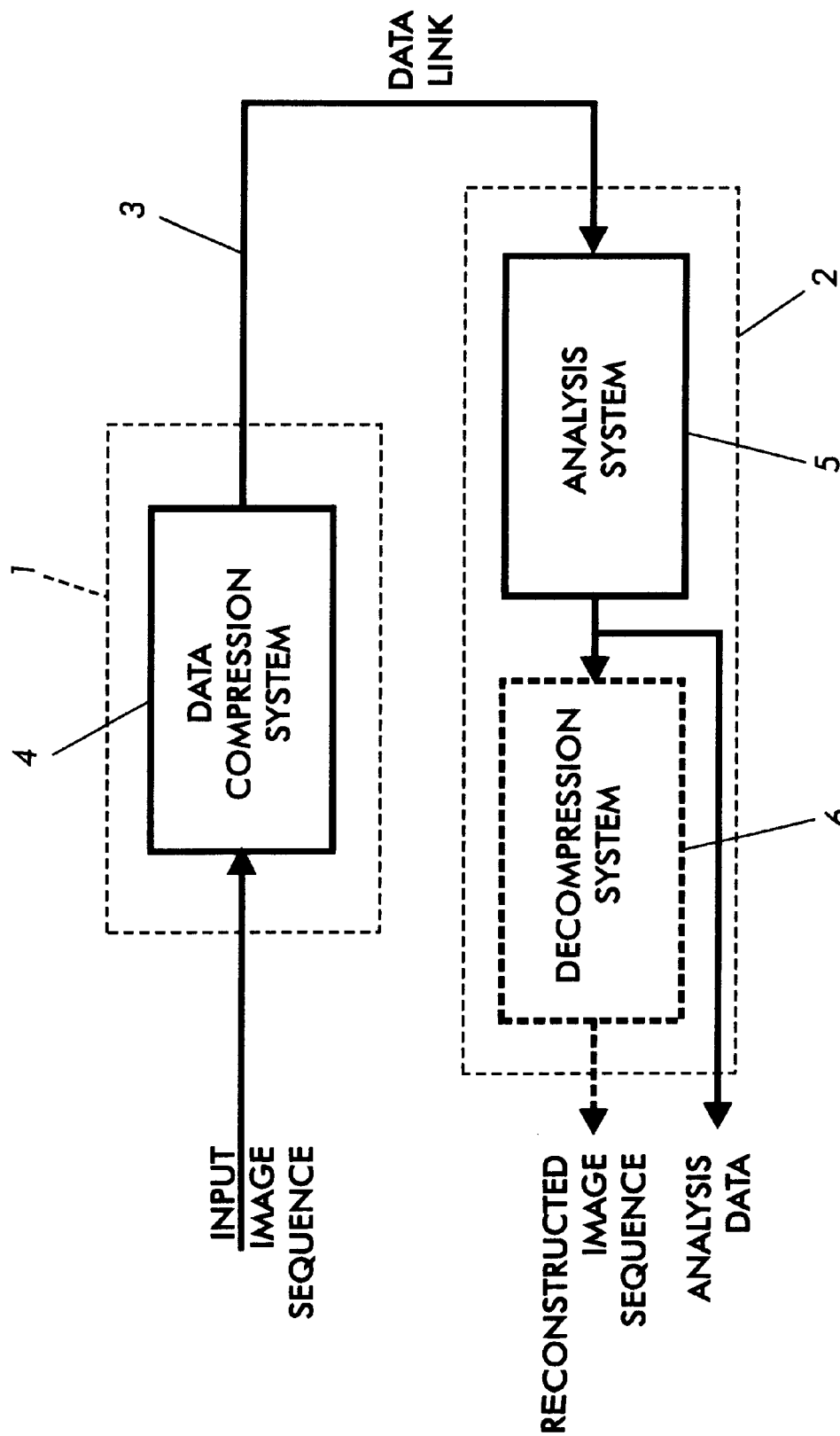
FIG. 1 is a simplified block diagram showing a sending unit (transmitter) including a data compression system, as well as a receiving unit having an analysis and an optional decompression system.
Figure 2:
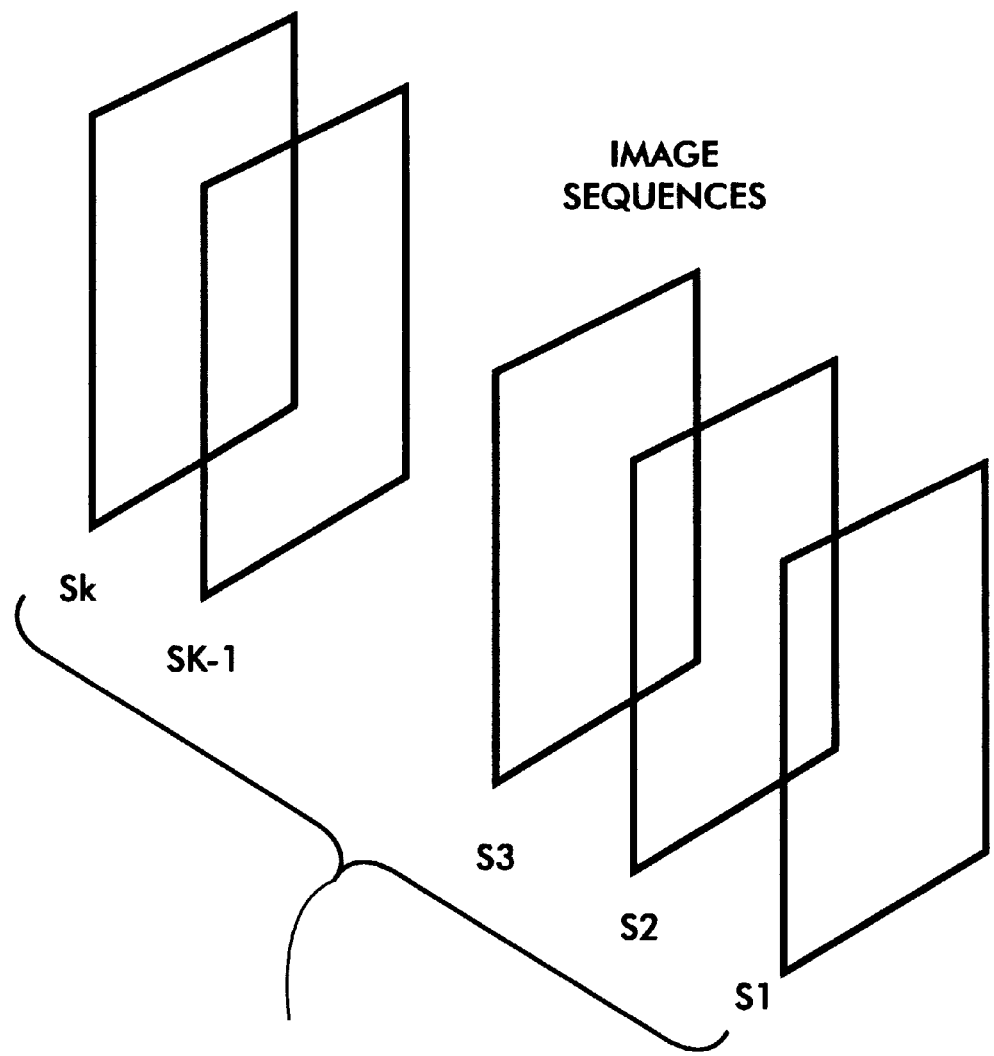
FIG. 2 is a simplified representation of a digitized image sequence S, composed of k frames.

Referring to FIG. 1, there is shown a schematic diagram of a sending unit 1 and a receiving unit 2 in which the output of the sending unit is connected to the input of the receiving unit by a data link 3. The data link can be a data transmission system, including, for example, a fiber-optic cable, a coaxial cable, computer hardware or storage. The sending unit includes a data compression system 4 whose input receives digitized video signals which are created electronically or obtained form an analog video source using a video digitizer. As shown in FIG. 2, the digitized video signals are represented by a temporal sequence of image frames, Sk, in which each frame comprises a two-dimensional array of a number of digitized picture elements or pixels having associated pixel signals corresponding to the scene content.

The receiving unit 2 includes an analysis unit 5 which provides segmentation results in accordance with the present invention, and an optional decompression system 6 which provides a reconstructed sequence of video signals for viewing on a display or printing.

Figure 3:
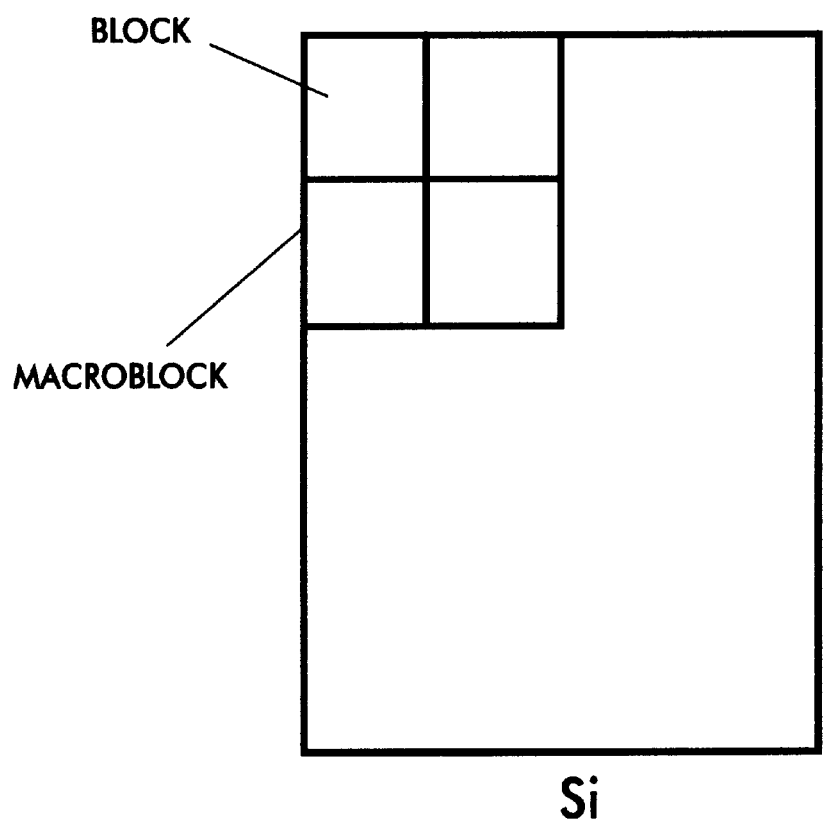
FIG. 3 is a simplified representation of a frame in an image sequence.
Figure 4:
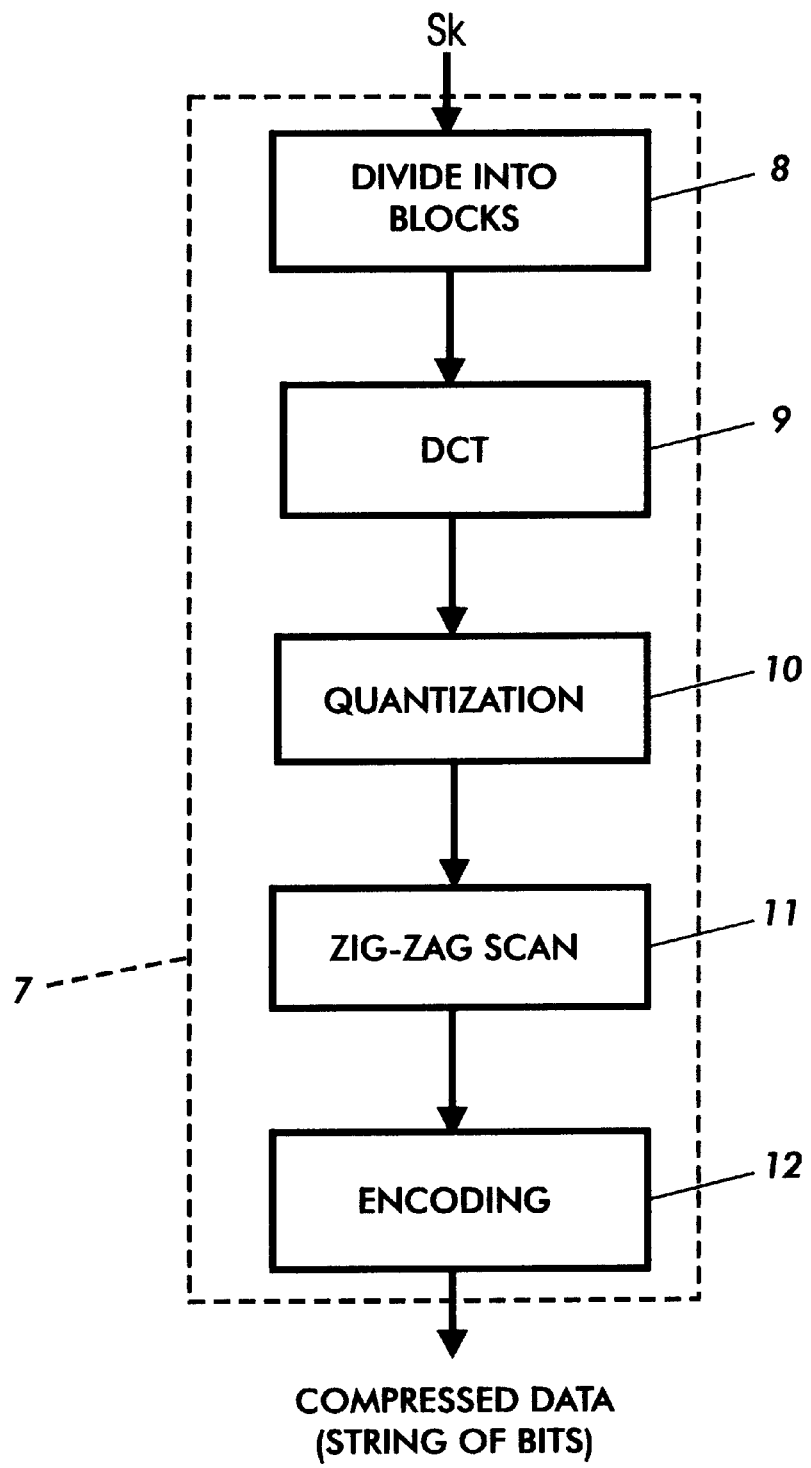
FIG. 4 is a simplified flow-chart illustrating how the MJPEG compression technique is applied to an image frame of an original image sequence.
Figure 5:
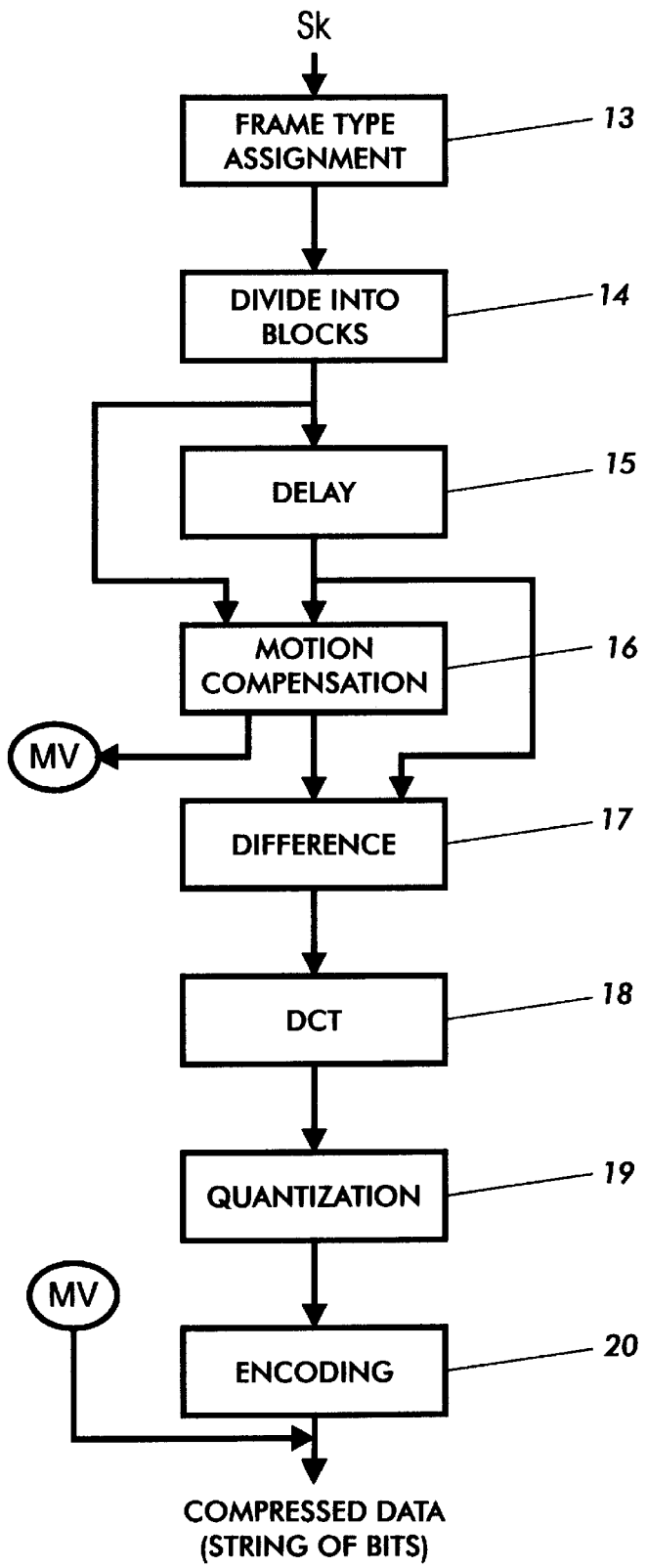
FIG. 5 is a simplified flow chart illustrating how the MPEG compression technique is applied to an original image sequence.

The background of the invention may serve to clarify the basic functions of the MJPEG and MPEG digital data sequence compression standards. In both cases, the input is an original image sequence S is retained as a quantity of digital data, such as by digitizing an analog video source, or otherwise creating an image sequence electronically, as on a computer. The data comprises a number of consecutive still frames indicated as Sk as shown in FIG. 2. Each frame is divided into a number of blocks, as shown in FIG. 3. In a typical case, each block comprises 64 pixels in an 8×8 array. Each of these blocks forming image Sk is then submitted to a compression method that may or may not interact with previous or subsequent frames. FIG. 4 and FIG. 5 show the basic flow chart of the MJPEG and MPEG techniques, respectively. In any case, as known in the prior art, the block data is converted into a string of binary digits (bits), with each string of bits being of an unpredictable length.

Although the present embodiment of the invention describes each block as representing a square array of pixels in an image, it is conceivable, under the claims herein, that a "block" could comprise a non-square or even a linear array of pixels within the image. Also, a "block" may correspond to any predefined region of an image encompassing multiple colors. In a preferred embodiment, one or a plurality of blocks of each color separation can be grouped to form larger structures known in JPEG as a minimum coded unit, or MCU. According to the present invention, it is understood that a "block" may represent one or multiple blocks, one or multiple MCUs, one or multiple macroblocks or one or multiple macroblocks.

The proposed method may be used in combination with "restart markers," which are a utility available within the JPEG (therefore within MJPEG) standard. A "restart marker" is an optional resource defined by JPEG comprising a specific and unique byte-aligned sequence of bits that can be inserted in the compressed bit stream. When used, it is placed periodically in the bit stream after a fixed number of compressed image blocks.

Figure 6:
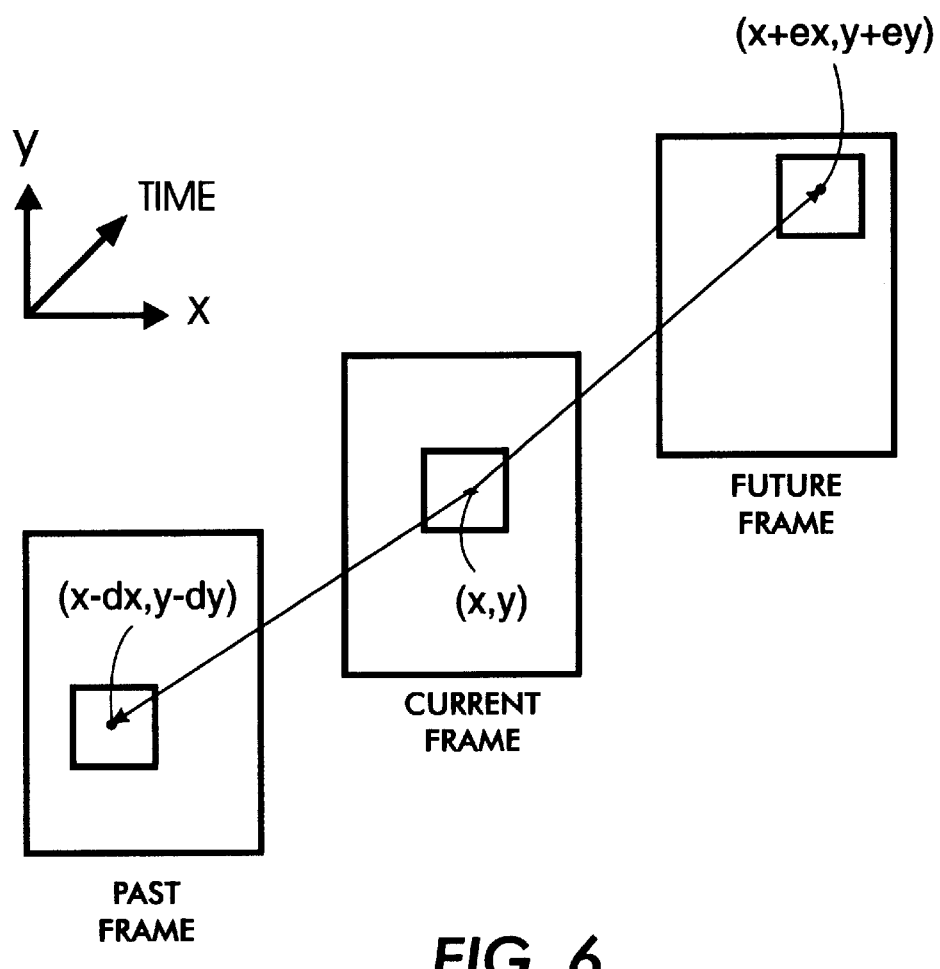
FIG. 6 shows schematically, the forward and backward motion vectors for a block within the current frame with respect to the past and the future frames in an image sequence and the blocks used for motion compensation.
Figure 7:
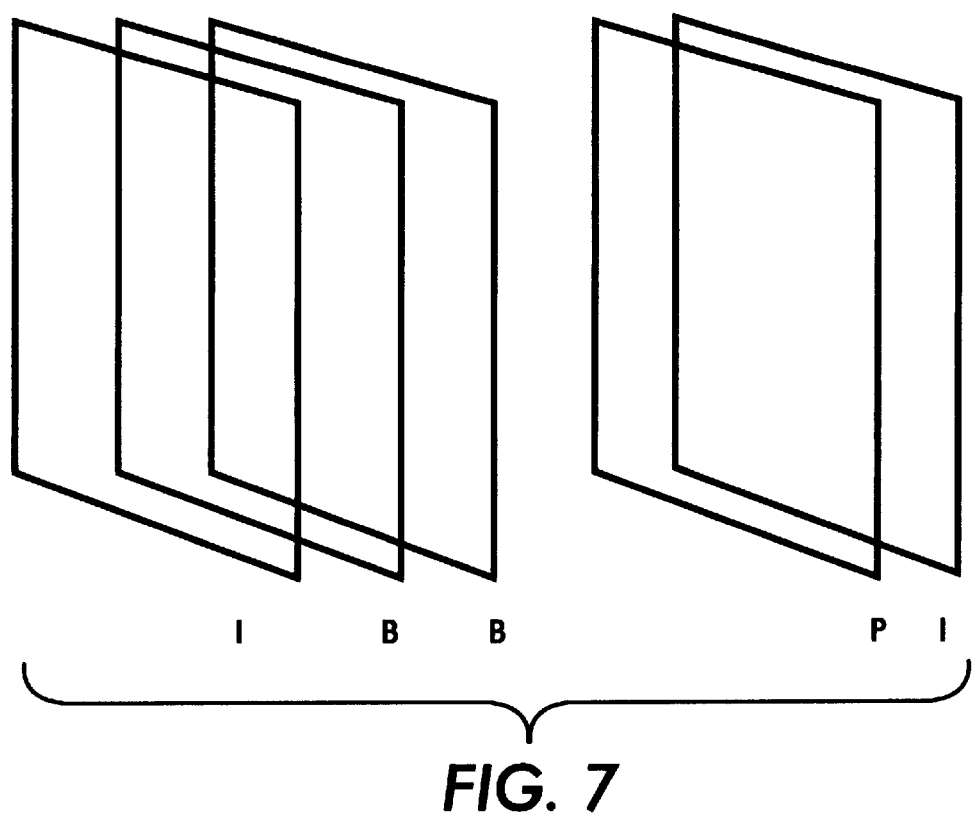
FIG. 7 is a schematic representation of the frame types in a sequence composed of k frames which are defined in the transmitter of FIG. 1.
Figure 8:
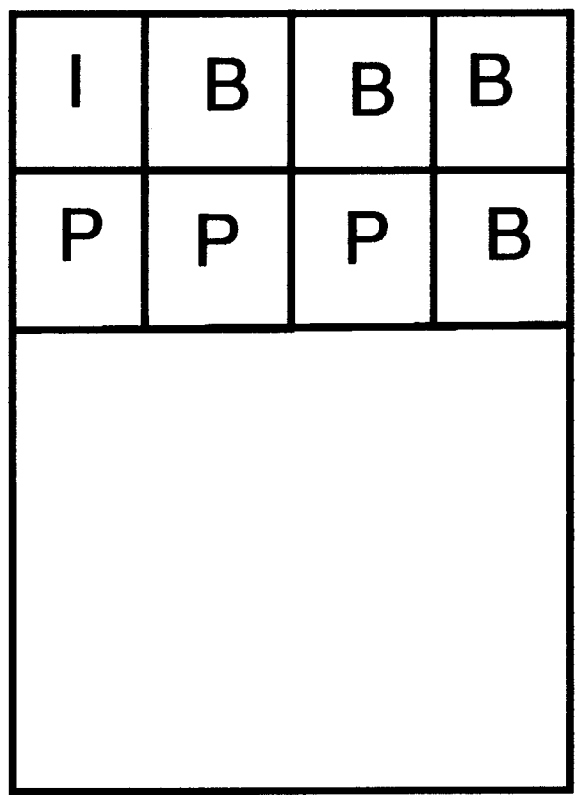
FIG. 8 is a simplified representation of a frame in an image sequence divided into a number of macroblocks with different types.

It is illustrative to separate the case where frames only contain intraframe encoded blocks from the case of frames which contain interframe encoded blocks. A block is referred to as being "intraframe" encoded if it is encoded by itself, without being predicted by blocks pertaining to preceding or subsequent frames. A block is referred to as being "interframe" encoded when it uses motion information collected from blocks pertaining to any preceding or subsequent frames as shown in FIG. 6. Frames that only contain intraframe encoded blocks are the frames in MJPEG, the I-frames in MPEG and occasionally B- or P-frames that do not contain motion compensation predicted blocks. FIG. 7 shows a typical image sequence composed of several I-, P- and B- frames. Frequently, B- and P-frames contain interframe encoded blocks as illustrated in FIG. 8.

As shown in FIG. 4, intraframe encoded blocks are converted into a string of bits through a sequence of operations by compression element 7. In the preferred embodiments of MJPEG and MPEG I-frames, each block containing 8×8=64 pixels is transformed using DCT element 9. The resulting compressed representations are divided by integer numbers and rounded using quantization element 10. The resulting integer output, originally displaced in a two dimensional block, are sequentially reorganized into a vector, following a zigzag scanning path, accomplished at zig-zag path element 11. Such a vector is encoded into a string of bits using a combination of run-length counting and Huffman coding by encoding element 12. It will no doubt be appreciated that this compression can be accomplished in either hardware or software implementations.

Figure 9:
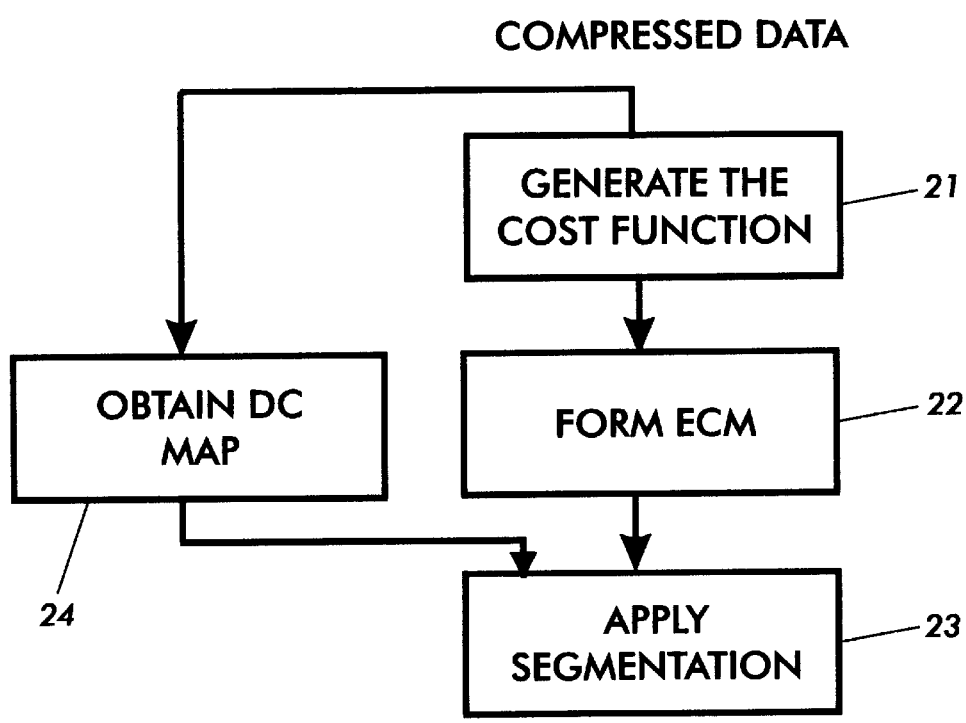
FIG. 9 is a simplified flow-chart illustrating the proposed method to obtain the encoding cost map and the DC map for the purpose of spatial segmentation.

In accordance with the present invention, beyond the basic steps of MJPEG/MPEG compression, the individual strings of bits, each string corresponding to one block of the original image sequence, are in turn used to derive a "cost function" for each block by the cost function generation element 21, in FIG. 9. The "cost function" is a value related to the length, in number of bits, of a bit string associated with a particular block in the original image. This cost function may be related to the exact number of bits in a particular string of bits, or could be otherwise related to this number such as the actual number of bits plus or minus some fixed number, or could be related to the number of bits as a result of any processing applied to the array of retained number of bits in each bit string. This cost function may also count the bits generated by "stuffing bytes", defined in the JPEG standard. In practice for a MJPEG/MPEG compression system, the length of the bit string for each block is expected to be small. The "cost function" may be encoded into an 8-bit cost function entry. It may also be optionally encoded using Huffman or any other entropy coding technique.

One important function of the receiver analysis system 5 (in FIG. 1) is to establish a relationship between the cost function and the actual position of the blocks within the image so that an "encoding cost map," or ECM, can be created by the encoding cost map generation element 22 in FIG. 9. Referring to this figure, an encoding cost map, or ECM, can be defined as a set of the cost functions of various blocks in the original image, understood as a two-dimensional map. It is thus clear that the relationship between blocks and cost functions can be established so that the various cost functions can be placed into a two-dimensional map. The ECM may be displayed to the user on a screen or in print. This ECM, as will be explained below, can itself be subjected to various image-processing techniques. The receiver may reconstruct an "encoding cost map", or ECM, with all or part of the cost functions where each entry is related to one block of the original image. The ECM can also be used to "segment" a received image by the segmentation element 23; that is, the ECM can be used to identify portions of a larger image, such as an image containing both text and continuous tone images, so that the received image can subsequently be printed with optimal techniques for each type of image, or that the image might be divided into the individual components. Image regions with high levels of detail often generate high valued ECM entries, while smooth regions tend to be fairly compressed, therefore, generating small ECM entries. Strong edges such as those present in text borders tend to generate high valued ECM entries, while pictorial material and background areas do not. In other words, the ECM can provide the necessary information to perform an image segmentation without decompressing the image.

It is understood that the ECM may be derived at the receiver or be transmitted as side information as described in the co-pending application Ser. No. 08/721,519, "Compression of Image Data with Retaining Cost Data for Each Compressed Image Block", by R. de Queiroz.

The teachings of the co-pending application Ser. No. 08/721,074, entitled "Using Encoding Cost Data for Segmentation and Background Suppression in JPEG-Compressed Images" by Eschbach and de Queiroz, describe a method to use the ECM to perform segmentation in still compressed images. In this application we extend this concept for the application of the ECM for segmentation of image sequences.

Therefore in accordance with present invention, we perform temporal segmentation for an image sequence. In temporal segmentation, image frames that are part of a sequence are identified and grouped according to particular characteristics. For this purpose, all image frames in an MPEG compressed sequence are used, including those containing interframe encoded blocks. For temporal segmentation purposes, an MJPEG sequence can be treated in the same manner as an MPEG sequence containing only I-frames. Therefore, we refer to MPEG sequences only, understanding that the processing applied to an I-frame sequence can be identically applied to an MJPEG sequence. In MPEG, the assignment of frame types is controlled by the transmitter 1 of FIG. 1, which can adjust the assignment in any convenient manner.

In a embodiment of MPEG, for B- and P-frames, blocks are predicted through motion compensation by the motion compensation element 16 (FIG. 5). For each block in the original image frame, a search for a matching block in an image frame in the past (forward motion prediction in a P-frame) or an image frame in the past or future (bidirectional motion prediction in a B-frame) is performed as illustrated in FIG. 7. Once a matching block is found, a vector indicating the magnitude and direction of motion is formed as a string of bits. The motion vector indicates how to find the matching block within the neighbor frame. The method is called motion compensation and may be applied to at least one block, i.e. a single motion vector can encompass several blocks. In effect, all blocks corresponding to a single motion vector are assumed to have the same interframe motion. The matching block is used as a predictor for the actual block. The difference between original and matching blocks is called a residual, and obtained by the difference element 17. The residual error is encoded using specific coding techniques resulting in a string of bits. If a good match is found, the strings of bits corresponding to the motion vector and residual error are transmitted to the receiver. The residual block is transformed by the DCT element 18, quantized by the quantization element 19 and encoded into a string of bits by encoding element 20 using the same method used for blocks in an I-frame. There may be other compression steps to encode the residual quantized DCT coefficients and motion vectors, but the final product is a string of bits for each block, each block resulting in a string of bits of a different length. If no good match is found for the present block among blocks in past and/or future frames, the block is encoded in the same way as blocks in I-frames. In effect, this is equivalent to predict the block as being a block with all zero pixels. Thus, the residual is the original block itself.

Each block is classified individually and such classification is encoded into a string of bits and transmitted to the receiver. The block classification informs the receiver if interframe or intraframe encoding was performed, among other information. There is also a provision to inform the receiver whether the block was simply skipped, in which case the receiver has to reconstruct the block from information received for previous frames (or subsequent frames in the case of bidirectional prediction) and from the information conveyed by the respective motion vector. Details can be found in the drafts ISO/IEC CD 11172 and ISO/IEC CD 13818-2, incorporated references above.

In one embodiment of a temporal segmentation method, it is the object of the segmentation to detect scene cuts, or regions where a depicted scene changes. The book Video and Image Processing Systems, incorporated herein by reference, describes in more detail the need for temporal segmentation through the detection of scene cuts. In the printing business it is an important technique for printing the significant frames of each scene.

As is the case for still frame segmentation, an important function of the receiver is to derive a cost function for each frame. Such a cost function is related to an amount of bits spent to encode an original frame. It is also an important function of the receiver to establish a relationship between the cost function and the actual position of the blocks frames within the image sequence, so that a "temporal cost vector," or TCV, can be created. A TCV can be defined as a set of the cost functions of various image frames in the original sequence, understood as a temporal sequence of numbers, each related to a particular image frame. This TCV can itself be subjected to various signal processing techniques.

In an embodiment of MPEG compression, at the beginning of every image frame, a header is initialized by a 4-byte sequence 0x00000100 (0010). This 32 bit sequence is byte aligned and is unique in the MPEG stream (i.e. it only occurs once per image frame). Thus, if the cost function is identical to a number of bits spent per image frame, it is only necessary to skip the file and count bytes in the MPEG bitstream, until reaching the sequence 0010. Once the 4-byte sequence is found, the accumulated byte count is the number of bytes actually used to encode an image frame. The simplicity of the method to derive the temporal cost function at the receiver side should be appreciated.

Figure 10:
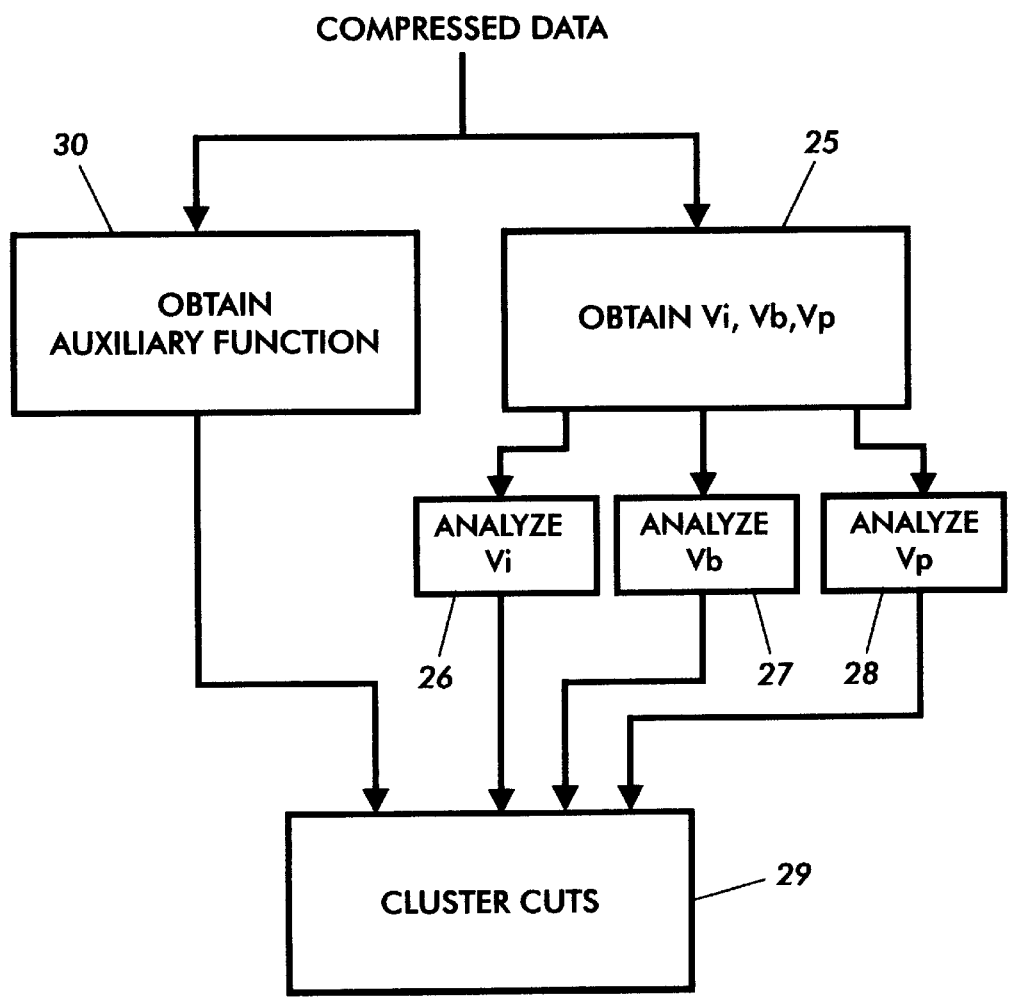
FIG. 10 is a simplified flow-chart illustrating the proposed method to obtain the temporal cost vector and the auxiliary function for the purpose of temporal segmentation.

A particular embodiment of a TCV based segmentation algorithm which is illustrated in FIG. 10 algorithm is as follows.

The algorithm detects suspected scene changes on I-, P- and B-frames separately first by the elements 25,26,27 and 28, then a final decision will be made to select the true scene cuts by the clustering element 29. As discussed there might be intraframe coded blocks in B- and P-frames. This occurs when the motion estimation is not accurate enough to compensate the MB. If there is a discontinuous scene cut on a P-frame most of its blocks will be intraframe encoded since they cannot be predicted from the previous I- or P-frame. This is also valid for not so abrupt continuous cuts known for those skilled in the art of video motion analysis as dissolve, fade, wipe, etc. During the interval where there is a continuous cut, the number of bits spent for P-frames will be high due to the increase in the number of intraframe encoded blocks. In the case of B-frames, continuous cuts have a similar effect. Since the motion estimation fails in such cases, the number of bits spent for B-frames will also increase. However, for the discontinuous cuts, they can be predicted either from the past or future P- or I-frames since the prediction error will be low. If the cut is after a B-frame, then backward motion vectors are used and if the cut is before a B-frame then forward motion vectors are used.

Figure 11:
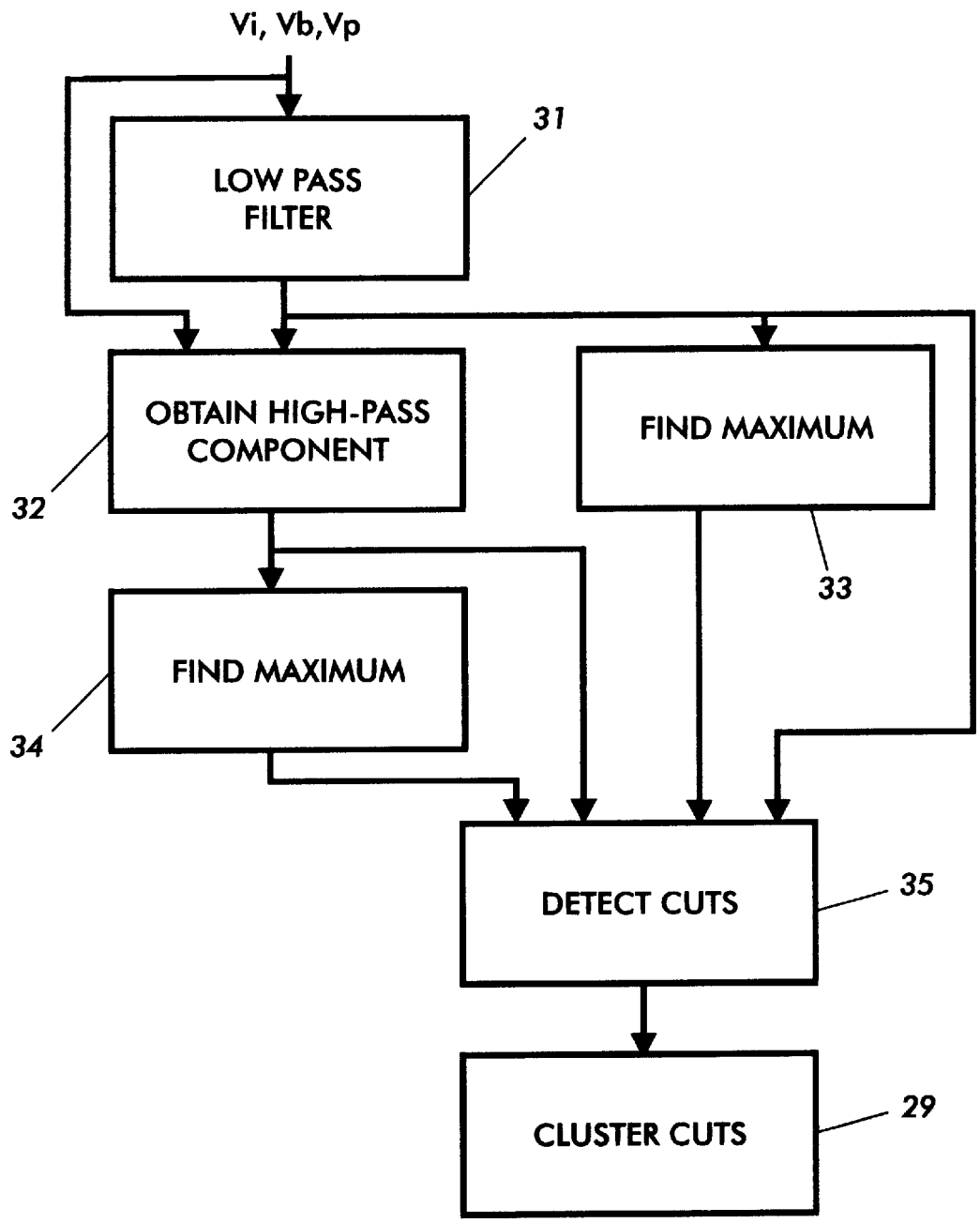
FIG. 11 is a simplified flow-chart illustrating how to analyze the temporal cost vector for the purpose of temporal segmentation.

The suspected scene changes on I-,P- and B-frames are found by detecting the peaks in both high and low frequency components of the number of bits extracted over the all image frames. For example, the following method can be applied: The TCV is derived obtaining vector V. Vector V is separated into the corresponding comprising components for B-, I-, and P-frames (Vi, Vp, Vb). Since the I-frames do not explore inter-correlation between image frames, the entries in the Vi vector may be actually composed by the differential cost function, i.e. the difference of the cost function between the present and the past image frames. For each of Vi, Vp, and Vb, we obtain hints of where scene cuts occur (frame numbers). All detected scene-cut frame numbers are thus combined in one vector, respecting original image frame numbering. Vector entries are 1 if the image frame was detected as belonging to a scene cut and are 0 otherwise. Image frames are clustered into scene cut regions that are at least T frames apart (T can be set to be the length of one group of pictures which is defined as the interval (in frames)T can be set to 15 which is a typical number of image frames between two I-frames in an image sequence). Scene cuts are presented as a 3-number index start-of-cut, end-of-cut, average-number. In more details, one embodiment of the present invention provides for the following operations for the detection of scene cuts in vectors Vi, Vp, or Vb, as illustrated in FIG. 11.

A low-pass filter is selected, for example the "Gaussian" discrete filter whose coefficients are {1, 3, 6, 7, 6, 3, 1}.

The input vector Vx, where Vx is used to identify either Vi ,Vb or Vp, is filtered in the low pass filter element 31 with the filter to obtain vector Lx.

A high-pass filtered vector is obtained as Hx=Vx−Lx by the element 32.

The maximum of Lx, denoted as MLx, is computed by the element 33.

The maximum absolute value of Hx, denoted as MHx, is computed by the element 34.

A scene cut at moment n is detected whenever $$|Hx(n)| > MHx - \left(C - \frac{Lx(n)}{MLx}\right)$$

where C is a confidence parameter between 0.1 and 1.0 and the parameter (n) indicates the frame number or the vector index by the cut detection element 35.

As the scene cut indicators are computed they are clustered by the clustering element 29 as described above to result in a first approximation of the suggested detection points for scene cuts. The higher the confidence parameter, the more likely the selected point is a scene cut. However, for high values of the confidence parameter, more true scene cuts may be undetected. The method is based in the concept that MPEG and other image sequence compression algorithms tend to spend few bits for low temporal activity (low movement) scenes while spending more bits for encoding sudden movement and scene changes.

In accordance with yet another aspect of the present invention, there is provided a method to utilize auxiliary information obtained by the element 30, in FIG. 10, for temporal segmentation. The auxiliary information can be composed of at least one of the following:

A function related to the histogram of the ECM entries of an image frame;

A function related to the differences of the ECM entries between consecutive image frames;

A function related to the histogram of the DC coefficients of an image frame;

A function related to the differences of the DC coefficients between consecutive image frames;

A function related to the number of bits spent to encode motion vectors within an image frame;

A function related to the histogram of motion vector intensities within an image frame;

A function related to the histogram of motion vector direction within an image frame;

A function related to the number of blocks selected to be intraframe encoded within a B- or P-frame; or A function related to the number of "skipped" blocks, i.e. reconstructed only through motion compensation, within a B- or P-frame.

It is understood that each auxiliary function retains a number, corresponding to an image frame of the image sequence. The auxiliary functions can be used to refine the detection of scene cuts, after a first pass pre-processing selection using the above described processing of the TCV. It is also possible to use the auxiliary functions to contest a detected scene cut out, to fine tune the estimated duration and type of the scene cut. The derivation of the above mentioned auxiliary functions is more computationally costly than the derivation of the TCV and it may be more practical in a computational standpoint to only derive the said auxiliary functions for a subset of the total number of image frames in the sequence, subject to pre-selection based on the TCV scene cut detection.

Avoiding an exhaustive description of every single combination of the auxiliary functions described above, as pertaining to the scope of the present invention, it is the intention of this invention to compute temporal changes on the said functions. As each function is itself a temporal vector, a similar method used for scene cut detection on the TCV can be additionally applied to at least one of the auxiliary function. Image frames suspected of belonging to scene cut regions are grouped and clustered into one scene cut which can be classified according to its duration and number of detection by the individual scene-cut detection processing, which are applied to individual auxiliary functions.

The disclosed method may be readily implemented in software using object oriented software development environments that provide portable source code that can be used on a variety of computer or workstation hardware platforms. Alternatively, the disclosed image processing system may be implemented partially or fully in hardware using standard logic circuits or specifically on a single chip using VLSI design. Whether software or hardware is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the computer arts.

While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

What is claimed is:

1. A method of processing compressed digital data derived from an original sequence of images, the digital data organized as a set of image frames, each image frame including a set of blocks, each block including a string of bits corresponding to an area of an image frame of the original sequence of images, comprising the steps of:

counting a number of bits for sets of at least one of said strings of bits in the compressed digital data;

deriving a cost function for each set of strings, said cost function being a number related to the number of bits in each set of strings of bits;

applying a temporal segmentation technique to the cost functions associated with strings of bits pertaining to at least two image frames represented in said compressed digital data;

identifying at least one image frame from said compressed digital data.

2. The method of claim 1, wherein the temporal segmentation is obtained as a function of the cost functions associated with the sum of bits for a whole image frame.

3. The method of claim 1, wherein the processing applied to the cost function comprises:

separating the cost function into a plurality of vectors, said vectors corresponding to each type of image frame, each type of image frame depending on a motion estimation strategy;

processing each vector with a plurality of filters;

applying local maxima detection to a combined filtered output for vector corresponding to an image frame type;

identifying any scene-cut positions as image frames corresponding to vectors' local maxima positions;

processing identified scene-cut positions for all image frame types, to thereby better represent scene-cut regions in said sequence.

4. The method of claim 1, wherein the identified image frames are replaced by precomputed image data.

5. The method of claim 1, wherein the identified image frames are extracted and printed.

6. The method of claim 1, wherein a spatial segmentation is applied to an identified image frame, said spatial segmentation identifying at least one region of the said image.

7. The method of claim 6, wherein the identified regions are replaced by precomputed image data.

8. The method of claim 6, wherein the identified regions are extracted and printed.

9. A method of processing compressed digital data derived from a sequence of images, the compressed data being organized as a set of image frames, each image frame comprising a set of blocks, each block comprising a string of bits corresponding to an area of a image frame of the original sequence, comprising the steps of:

counting a number of bits of a plurality of said strings of bits in the original sequence of images;

deriving a cost function for each set of strings of bits, said cost function being a value related to the number of bits in each set of strings of bits;

deriving an auxiliary function from the compressed data, said auxiliary function distinct from the cost function and related to the relationship of the set of image frames; and applying a temporal segmentation technique to the cost functions in combination with the auxiliary functions associated with at least two images frames;

identifying at least one image frame.

10. The method of claim 9, wherein, the digital data is compressed using a discrete cosine transform method, each block therein having a DC component associated therewith, the auxiliary function is a map of the DC components of the blocks within a image frame.

11. The method of claim 9, wherein the digital data is compressed using a discrete cosine transform method, each block therein having a DC component associated therewith, the auxiliary function is related to a histogram of the DC component of the blocks within a image frame.

12. The method of claim 9, wherein the auxiliary function is a function related to any motion vectors associated with said image frames.

13. The method of claim 9, wherein the auxiliary function is a function related to a classification associated with said image frames, said classification provided as embedded data into the compressed data.

14. The method of claim 9, wherein the auxiliary function is a function related to a classification associated with the blocks within an image frame, said classification provided as embedded data into the compressed data.

15. The method of claim 9, wherein the segmentation technique processes the cost function associated with the cost function value for the whole image frame.

16. The method of claim 9, wherein the identified image frames are replaced by precomputed image data.

17. The method of claim 9, wherein the identified image frames are extracted and printed.

18. The method of claim 9, wherein a spatial segmentation is applied to an identified image frame, said spatial segmentation identifying at least one region of the said image.

19. The method of claim 18, wherein the identified regions are replaced by precomputed image data.

20. The method of claim 18, wherein the identified regions are extracted and printed.

* * * * *